United States Patent
Igubnov

(10) Patent No.: US 11,200,093 B2
(45) Date of Patent: Dec. 14, 2021

(54) MANAGEMENT OF A GEOMECHANICAL WORKFLOW OF A GEOMECHANICS APPLICATION IN A COMPUTER SYSTEM

(71) Applicant: Baker Hughes Oilfield Operations LLC, Houston, TX (US)

(72) Inventor: Alexander Igubnov, Katy, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 330 days.

(21) Appl. No.: 16/511,744

(22) Filed: Jul. 15, 2019

(65) Prior Publication Data

US 2021/0019191 A1 Jan. 21, 2021

(51) Int. Cl.
*G06F 9/50* (2006.01)

(52) U.S. Cl.
CPC .................... *G06F 9/5038* (2013.01)

(58) Field of Classification Search
None
See application file for complete search history.

(56) References Cited

U.S. PATENT DOCUMENTS

| | | | |
|---|---|---|---|
| 5,812,068 A * | 9/1998 | Wisler | E21B 47/022 340/855.5 |
| 7,653,563 B2 * | 1/2010 | Veeningen | G06Q 40/025 705/7.28 |
| 9,043,154 B2 * | 5/2015 | Luxey | G01V 99/00 702/11 |
| 10,019,684 B2 | 7/2018 | Kurian et al. | |
| 2004/0122640 A1 * | 6/2004 | Dusterhoft | E21B 43/00 703/10 |
| 2005/0149267 A1 * | 7/2005 | Van Den Beukel | G01V 1/30 702/14 |
| 2005/0209836 A1 * | 9/2005 | Klumpen | G06Q 10/06312 703/10 |
| 2005/0234690 A1 * | 10/2005 | Mainguy | G01V 1/282 703/10 |
| 2007/0199721 A1 * | 8/2007 | Givens | G06Q 10/06312 166/382 |
| 2008/0319675 A1 * | 12/2008 | Sayers | G01V 1/50 702/11 |
| 2010/0000792 A1 * | 1/2010 | Alberty | E21B 49/00 175/50 |
| 2011/0153296 A1 * | 6/2011 | Sadlier | E21B 44/00 703/7 |
| 2014/0214325 A1 * | 7/2014 | Wessling | E21B 47/06 702/11 |

(Continued)

*Primary Examiner* — Hiren P Patel
(74) *Attorney, Agent, or Firm* — Mintz Levin Cohn Ferris Glovsky and Popeo, PC; Lisa Adams

(57) ABSTRACT

Systems are provided for management of a geomechanical workflow of a geomechanics application in a computer system. The systems can include a client computer system can be communicatively coupled via a computer network to a geomechanical data source including one or more sensors configured to measure geomechanical data characterizing one or more aspects of a geomechanical feature. The systems can further include sets of program codes for instantiating a Calculation Manager object, a Calculation Manager Extension object, and a Workflow Run object for reconstructing a geomechanical workflow in response to a changed event in the geomechanical data.

12 Claims, 4 Drawing Sheets

(56) References Cited

U.S. PATENT DOCUMENTS

| | | | |
|---|---|---|---|
| 2015/0377019 A1* | 12/2015 | Gleitman | E21B 49/006 |
| | | | 166/250.01 |
| 2016/0123117 A1* | 5/2016 | Gu | E21B 47/07 |
| | | | 166/305.1 |
| 2017/0205531 A1 | 7/2017 | Berard et al. | |
| 2018/0016875 A1* | 1/2018 | Shokanov | E21B 21/01 |
| 2018/0058211 A1* | 3/2018 | Liang | G01V 1/282 |
| 2018/0113966 A1* | 4/2018 | Reese | E21B 41/0092 |
| 2018/0179879 A1* | 6/2018 | Ma | E21B 44/00 |
| 2019/0360330 A1* | 11/2019 | Wheeler | E21B 49/008 |
| 2020/0096671 A1* | 3/2020 | Garcia-Teijeiro | G01V 1/345 |
| 2020/0327481 A1* | 10/2020 | Allouche | E21B 41/00 |
| 2021/0003727 A1* | 1/2021 | Zhu | E21B 43/26 |
| 2021/0182870 A1* | 6/2021 | Degeneffe | H04W 4/021 |

\* cited by examiner

MANAGEMENT OF A GEOMECHANICAL WORKFLOW OF A GEOMECHANICS APPLICATION IN A COMPUTER SYSTEM

FIELD

Systems for managing a geomechanical workflow of a geomechanics application in a computer system are provided.

BACKGROUND

A geomechanical workflow as implemented in a geomechanics application, such as JewelSuite™ developed by Baker Hughes, can be designed to lead a user step-by-step through a variety of geomechanics-related processes, such as quantifying geomechanical or drilling risks, identifying geologic hazards, mitigating abnormal pressure-related well control issues, defining safe operating windows for pressurized seals (e.g., National Pipe Thread (NPT)), performing uncertainty assessments to identify high risk scenarios, and so on. Typically, the geomechanical workflow steps are "hard-coded" into the geomechanics application, meaning the number of steps, their order, and the dependency between them are embedded into the application. While there are options for adding to or "extending" the functionality of a geomechanical workflow (e.g., a user-developed plug-in (or add-in) with additional workflow steps and calculations), the extended functionality can merely exist as an independent software module, failing to change the main logic of the geomechanics application.

Accordingly, there remains a need for a geomechanics application architecture that provides the ability not only to extend, but fully change a geomechanical workflow, which is embedded in the geomechanics application, to enable end users to construct new geomechanical workflows using existing workflow steps, as well as their own proprietary workflow steps.

SUMMARY

Systems are provided for management of a geomechanical workflow of a geomechanics application in a computer system. The systems discussed herein can provide for a main geomechanics application core that is fully customizable, enabling end users to change the main geomechanics application logic, interfere with the core geomechanical workflows, and build custom geomechanical workflows using proprietary workflow calculations along with calculations from the geomechanics application core. In certain exemplary embodiments, a client computer system can be communicatively coupled via a computer network to a geomechanical data source including one or more sensors configured to measure geomechanical data characterizing one or more aspects of a geomechanical feature. The client computer system can include a communication unit configured to receive the geomechanical data from the geomechanical data source via the computer network, a memory configured to store a plurality of program codes, and a hardware processor configured to execute one or more of the plurality of program codes, which when executed cause the hardware processor to implement a geomechanical workflow control module.

In certain exemplary embodiments, the geomechanical workflow control module can comprise a first set of program codes for instantiating a Calculation Manager object configured to receive an indication of a first changed event in the geomechanical data triggering a reconstruction of the geomechanical workflow, to identify one or more first geomechanical calculations depending from the first changed event and one or more second geomechanical calculations depending from the one or more first geomechanical calculations, and to reconstruct the geomechanical workflow such that the geomechanical workflow includes each of the first and second geomechanical calculations, a second set of program codes for instantiating a Calculation Manager Extension object configured to identify one or more third geomechanical calculations depending from the first changed event, the one or more third geomechanical calculations different from each of the first and second geomechanical calculations, wherein the reconstructed geomechanical workflow further includes the one or more third geomechanical calculations, and a third set of program codes for instantiating a Workflow Run object configured to cause the hardware processor to execute the reconstructed geomechanical workflow, wherein each of the first, second, and third sets of program codes is stored in the memory.

In some embodiments, the Calculation Manager object can be further configured to assign a priority to each of the first and second geomechanical calculations and to reconstruct the geomechanical workflow such that the geomechanical workflow includes each of the first and second geomechanical calculations in an order determined according to the assigned priority, such that the hardware processor executes each of the first and second geomechanical calculations in the determined order.

In some embodiments, the Calculation Manager Extension object can be further configured to assign a priority to each of the third geomechanical calculations, and the Calculation Manager object can be further configured to reconstruct the geomechanical workflow such that the geomechanical workflow includes each of the first, second, and third geomechanical calculations in an order determined according to the assigned priority, such that the hardware processor executes each of the first, second, and third geomechanical calculations in the determined order.

In some embodiments, the Calculation Manager object can be further configured to generate a composite priority of each of the first, second, and third geomechanical calculations based on the priority assigned to each of the third geomechanical calculations by the Calculation Manager Extension object.

In some embodiments, the geomechanical workflow control module can further comprise a fourth set of program codes for instantiating a Changed Event object configured to detect the first changed event in the geomechanical data and to provide the indication of the changed event to the Calculation Manager object, the fourth set of program codes stored in the memory.

In some embodiments, each of the first and second geomechanical calculations can represent a geomechanical calculation unique to the Calculation Manager object, and each of the third geomechanical calculations can represent a geomechanical calculation unique to the Calculation Manager Extension object.

In some embodiments, the Calculation Manager Extension object can be further configured to detect a second changed event in the geomechanical data triggering a reconstruction of the geomechanical workflow, the second changed event different from the first changed event, to identify one or more fourth geomechanical calculations depending from the second changed event, the one or more fourth geomechanical calculations different from each of the first, second, and third geomechanical calculations, and to notify the Calculation Manager object of the one or more fourth geomechanical calculations, the reconstructed geomechanical workflow further including the one or more fourth geomechanical calculations.

In some embodiments, the second changed event can be undetected by the Calculation Manager object.

Furthermore, in certain exemplary embodiments, the geomechanical workflow control module can comprise a first set of program codes for instantiating a Calculation Manager object configured to receive an indication of a first changed event in the geomechanical data triggering a reconstruction of the geomechanical workflow and to identify one or more first geomechanical calculations depending from the first changed event and one or more second geomechanical calculations depending from the one or more first geomechanical calculations, a second set of program codes for instantiating a Calculation Manager Extension object configured to receive an indication of a second changed event in the geomechanical data triggering a reconstruction of the geomechanical workflow, the second changed event different from the first changed event, to identify one or more third geomechanical calculations depending from the second changed event, and to reconstruct the geomechanical workflow such that the geomechanical workflow includes each of the first, second, and third geomechanical calculations, and a third set of program codes for instantiating a Workflow Run object configured to cause the hardware processor to execute the reconstructed geomechanical workflow, wherein each of the first, second, and third sets of program codes is stored in the memory.

In some embodiments, operation of the Calculation Manager object can implement core application logic of the geomechanics application, and operation of the Calculation Manager Extension object can implement application logic of an add-in module inaccessible to the Calculation Manager object.

In some embodiments, the Calculation Manager object can be further configured to assign a priority to each of the first and second geomechanical calculations, and the Calculation Manager Extension object can be further configured to assign a priority to each of the third geomechanical calculations and to reconstruct the geomechanical workflow such that the geomechanical workflow includes each of the first, second, and third geomechanical calculations in an order determined according to the assigned priority, such that the hardware processor executes each of the first, second, and third geomechanical calculations in the determined order.

In some embodiments, each of the first and second geomechanical calculations can represents a geomechanical calculation unique to the Calculation Manager object, and each of the third geomechanical calculations can represent a geomechanical calculation unique to the Calculation Manager Extension object.

In some embodiments, the second changed event can be undetected by the Calculation Manager object.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Conventional geomechanical workflow steps are "hard-coded" into a geomechanics application. This means that the number of steps, their order, and the dependency between them are embedded into the geomechanics application, unable to be altered by the end user. The systems discussed herein, however, can provide for a main geomechanics application core that is fully customizable, enabling users to insert or combine their own, proprietary calculations (logic) into the core geomechanics application workflow. Furthermore, users can create their own geomechanical workflows utilizing a combination of existing geomechanical workflow steps as well as geomechanical workflow steps specified in user-created add-ins.

A geomechanical workflow can be described as a series of calculations, or a geomechanical calculation "chain," where every calculation depends from the calculation(s) before and affects any calculations that follow. The geomechanics application can execute the workflow calculations to perform an action with respect to a geomechanical feature. As would be understood by a person of ordinary skill in the art, a geomechanical feature, as defined herein, can be inclusive of any feature associated with a geomechanical operation such as, for example, wells or wellbores, reservoirs, drills, geologic materials or fluids (e.g., rock, soil, oil, water, etc.), and so on.

Figure 1:
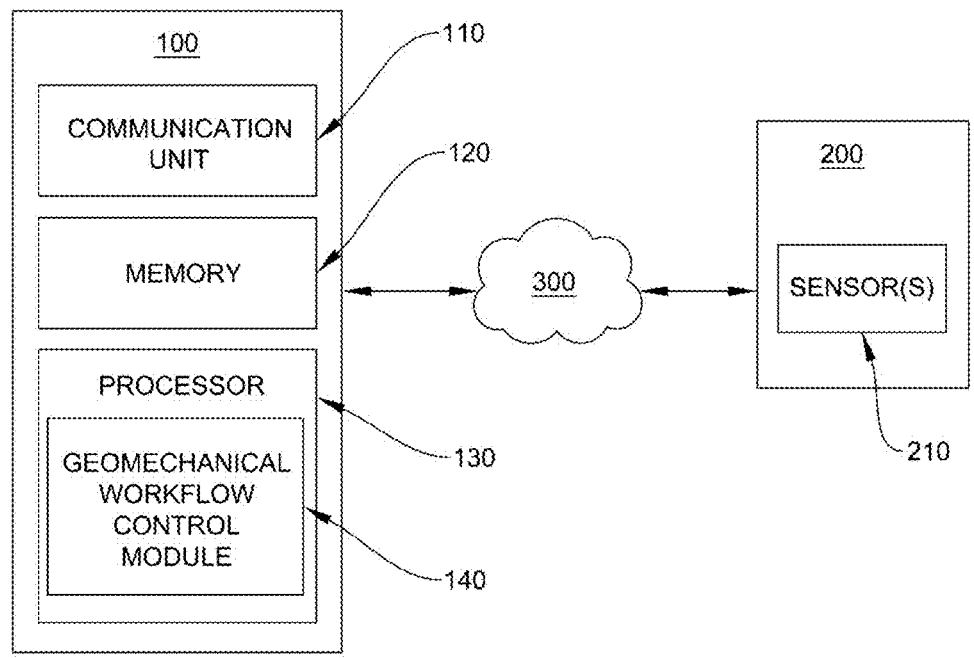
FIG. 1 is a diagram illustrating an architectural view of a system for managing a geomechanical workflow of a geomechanics application in a computer system according to embodiments of the present disclosure.

Referring first to FIG. 1, a client computer system 100, which can be configured to implement a geomechanics (GM) application 400 (see FIGS. 2-4) as described below, can be connected to a computer network 300. The computer network 300 can be a wireless network, such as a wide area network (WAN) (e.g., a cloud-based network), a local area network (LAN), or the like, or a wired network. The client computer system 100 can be communicatively coupled via the computer network 300 to a geomechanical data source 200. The geomechanical data source 200 can include one or more sensors 210 configured to measure geomechanical data 220 (see FIGS. 2-4) characterizing one or more aspects of the geomechanical feature (not shown) as defined above. The geomechanical data 220 can include any data characterizing one or more aspects of the geomechanical feature such as, for example, pressure and/or stress measurements acquired during drilling in or around a wellbore, although the geomechanical data 220 is not limited solely thereto. In some embodiments, the geomechanical data source 200 can be a geomechanical data collection device, such as an Internet of Things (IoT) device, located on-site to collect the geomechanical data 220 and transmit the collected data 220 to the remotely located client computer system 100.

As shown in FIG. 1, the client computer system 100 can include a plurality of components each of which communicatively coupled to the others. For instance, the client computer system 100 can include a communication unit 110 configured to receive the geomechanical data 220 from the geomechanical data source 200 via the computer network 300. The communication unit 110 can include any device capable of receiving data transmitted from the geomechanical data source 200 over the network 300. In some embodiments, the communication unit 110 can be a communication modem configured to receive data via any of a wide range of communication protocols including, but not limited to, broadband protocols, radio protocols (e.g., WiFi, WiMax, etc.), cellular protocols (e.g., 3G, 4G, 5G, LTE, etc.), and so on.

The client computer system 100 can further include a memory 120 configured to store a plurality of program codes executable by the processor 130. In some embodiments, the plurality of program codes stored in the memory 120 can include various sets (e.g., first, second, third, fourth, etc.) of program codes for instantiating particular objects of the geomechanical workflow control module 140, as described in greater detail below.

The client computer system 100 can further include a hardware processor 130 configured to execute one or more of the plurality of program codes stored in the memory 120. Upon executing one or more of the plurality of stored program codes, the processor 130 can implement a geomechanical workflow control module 140 which realizes the geomechanics application 400 configured to construct a geomechanical workflow 500, as described in greater detail below.

Figure 2:
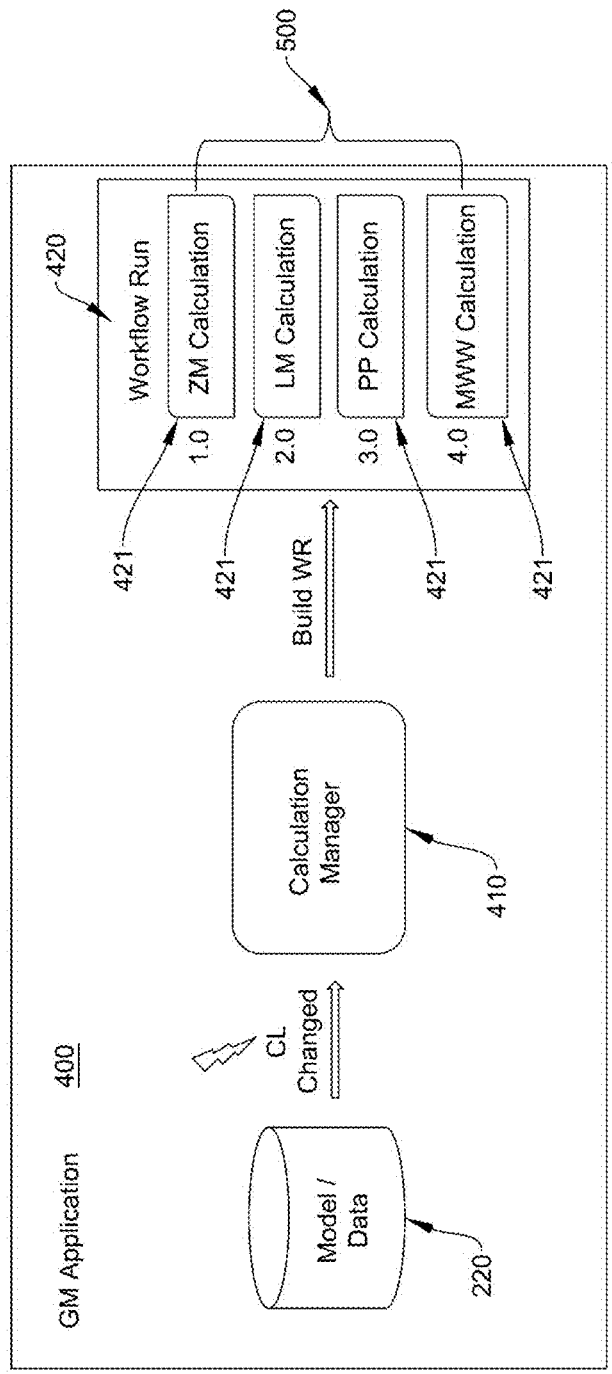
FIG. 2 is a diagram illustrating the conventional construction of a geomechanical workflow in a geomechanics application.

Referring next to FIG. 2, which is a diagram illustrating the conventional construction of a geomechanical workflow 500, a geomechanics application 400 can embody a plurality of instantiated objects including, for example, at least a Calculation Manager object 410. The Calculation Manager object 410 can receive the geomechanical data 220 from the geomechanical data source 200 and observe changes happening in the data 220, as well as changes in predefined geomechanical models (e.g., lithology models, stress models, pressure models, stratigraphic models, fault models, structural models, etc.) for processing the geomechanical data 220. The Calculation Manager object 410 can then react to these changes by triggering calculations which depend from the changed geomechanical data.

The geomechanics application 400 can further embody a Changed Event object configured to characterize any changes ("changed event") in the geomechanical data 220 and/or geomechanical models and a Workflow Run object 420 that contains a list of geomechanical calculations to be executed by the processor 130 in response to the changed event. The list of geomechanical calculations (e.g., calculations 421 or 422) can comprise the geomechanical workflow 500.

To illustrate, an exemplary geomechanical workflow 500 for analyzing wellbore stability can include the following process: (1) create Composite Logs (CL); (2) calculate Zonation Model (ZM); (3) calculate Lithology Model (LM); (4) calculate Rock Properties (RP); (5) calculate Pore Pressure (PP); (6) calculate Lower and Upper Bounds (LB and UB); and (7) calculate Mud Weight Window (MWW). Assume, for example, the changed event involves a modification of the composite logs (e.g., new data is acquired by sensor(s) 210 of geomechanical data source 200 during drilling process, new data is provided from an alternative data source, etc.). Since the input data (composite logs) is changed, models ZM and LM must be updated. Updating the ZM and LM can affect the PP calculation, as it depends from ZM and LM. In turn, the LB and UB must be re-calculated based on the re-calculated PP, and so on.

Upon receiving the changed event (e.g., changed composite logs), the Calculation Manager object 410 can identify the geomechanical workflow calculations 421 that depend from the composite logs. In this case, the ZM and LM calculations 421 can depend directly from the composite logs. That is, the first step for reconstructing the geomechanical workflow 500 upon recognizing the changed composite logs can be re-calculating the ZM and LM. Next, the Calculation Manager object 410 can identify the geomechanical workflow calculations 421 depending from the ZM and LM—the PP calculation 421. That is, re-calculation of the ZM and LM can induce re-calculation of the PP. The Calculation Manager object 410 can then identify the MWW calculation 421 as depending from the PP calculation 421. Having identified the geomechanical calculations 421 necessary for reconstructing the geomechanical workflow 500, the Calculation Manager object 410 can assign the appropriate priority rating to each calculation 421, such that the calculations 421 are executed by the processor 130 in the proper order, and generate the updated geomechanical workflow 500 accordingly. Finally, the Workflow Run object 420 can cause the processor 130 to execute the reconstructed geomechanical workflow 500.

The above-described logic is a main, "hard-coded" component of the geomechanics application 400. Consequently, the geomechanical workflow logic, as defined in calculations dependency analysis code stored in memory 120, cannot be modified, even if a user develops plug-in (or add-in) architecture, which merely implements its own geomechanical calculations based on existing changed events.

Figure 3:
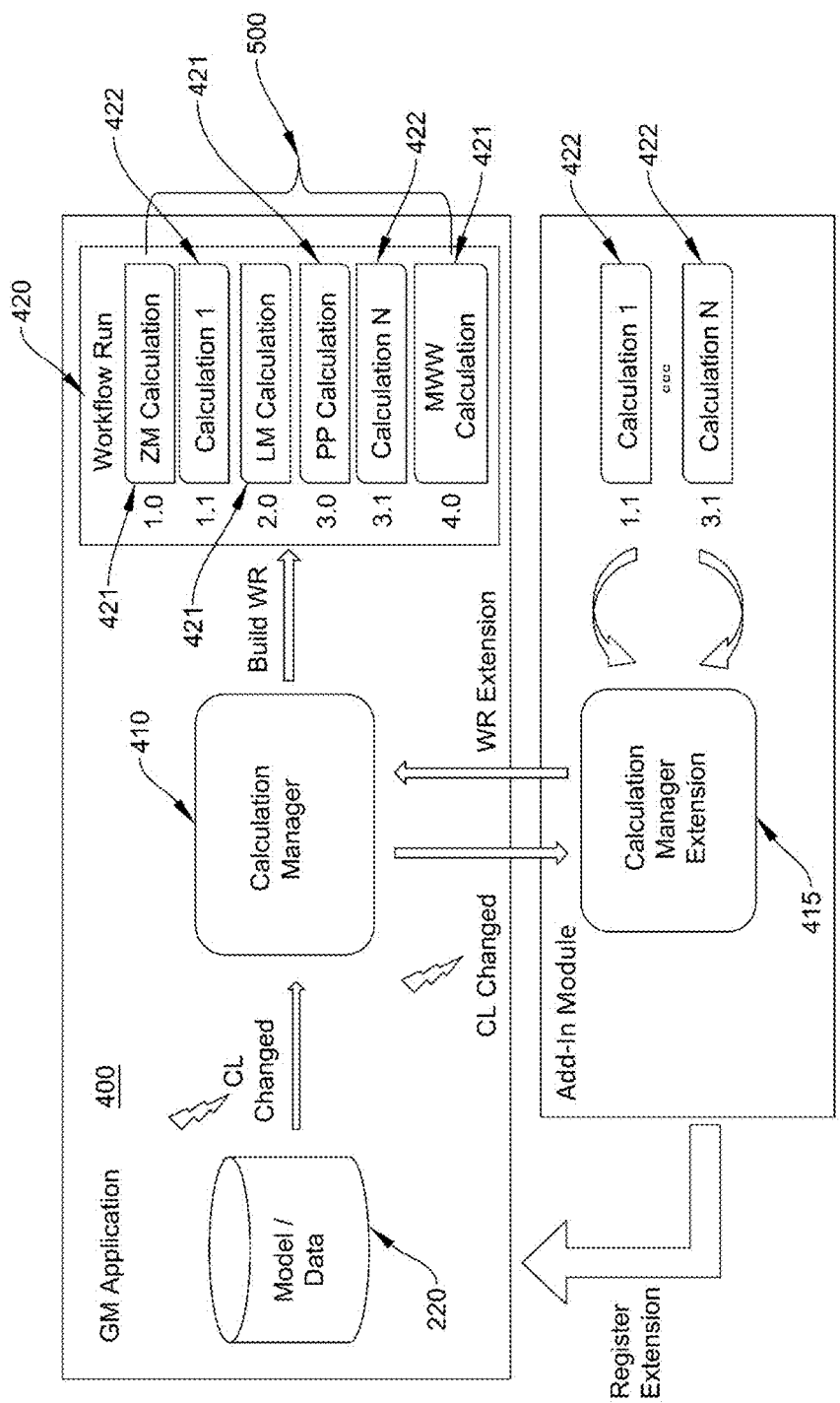
FIG. 3 is a diagram illustrating the construction of a geomechanical workflow in a geomechanics application incorporating supplementary workflow calculations according to embodiments of the present disclosure.

Referring next to FIG. 3, which is a diagram illustrating the construction of the geomechanical workflow 500 in the geomechanics application 400 incorporating supplementary workflow calculations according to embodiments of the present disclosure, the geomechanics application 400 can register an extension for the Calculation Manager object 410 in which an add-in module enhances the geomechanics application 400 functionality by responding to changed events under observation by the Calculation Manager object 410 and adding new geomechanical workflow calculations 422 from the add-in module-side to the geomechanical workflow 500.

In detail, the geomechanical workflow control module 140 can comprise a first set of program codes for instantiating the Calculation Manager object 410, a second set of program codes for instantiating the Calculation Manager Extension object 415, and a third set of program codes for instantiating the Workflow Run object 420. Each of the first, second, and third sets of programs codes can be stored in the memory 120 of the client computer system 100. In some embodiments, the geomechanical workflow control module 140 can further comprise a fourth set of program codes for instantiating a Changed Event object. The fourth set of program codes can be stored in the memory 120 of the client computer system 100.

To illustrate, the Calculation Manager object 410 can, firstly, receive an indication of a change ("changed event" or "first changed event") in the geomechanical data 220 and/or geomechanical models. For example, the changed event can entail the changing of input data, in this case, composite logs (CL). Such event can trigger a reconstruction of the geomechanical workflow 500. In some embodiments, the changed event can be detected by the Changed Event object which notifies the Calculation Manager object 410 of the same.

Next, the Calculation Manager object 410 can identify one or more geomechanical calculations 421 ("first geomechanical calculations") depending directly from the composite logs. In this example, as described above, the first geomechanical calculations can include the ZM and LM calculations 421. The Calculation Manager object 410 can then identify one or more geomechanical calculations 421 ("second geomechanical calculations") depending directly from the first geomechanical calculations 421, i.e., ZM and LM calculations 421. In this example, as described above, the PP calculation 421 can depend from ZM and LM calculations 421. The Calculation Manager object 410 can finally identify the MWW calculation 421 as depending from the PP calculation 421. Thus, the Calculation Manager object 410 can identify all geomechanical calculations 421 (e.g., ZM calculation, LM calculation, PP calculation, and MWW calculation) requiring updating in response to detection of the changed event (e.g., changed composite logs).

Upon identifying all geomechanical calculations requiring updating in response to detection of the changed event, the Calculation Manager object 410 can reconstruct the geomechanical workflow 500 such that the geomechanical workflow 500 includes each of the first and second geomechanical calculations 421. In this regard, the Calculation Manager object 410 can assign a priority to each of the identified geomechanical calculations 421, such that the processor 130 executes each of the geomechanical calculations 421 in an order determined according to the assigned priorities, and generate the geomechanical workflow 500 so as to include the prioritized geomechanical calculations 421. The Workflow Run object 420 can then cause the processor 130 to execute the reconstructed geomechanical workflow 500.

Before execution of the geomechanical calculations 421 in the geomechanical workflow 500, the Calculation Manager object 410 can communicate with all registered extensions, such as Calculation Manager Extension object 415, to determine whether such extensions have any geomechanical calculations 422 which depend from the changed event (e.g., changed composite logs). As shown in FIG. 3, for example, the Calculation Manager Extension object 415 can respond to the Calculation Manager object 410 with an indication that it has identified two geomechanical calculations 422 ("third geomechanical calculations"), e.g., Calculation 1 and Calculation N, depending from the composite logs. The third geomechanical calculations 422 can be different from the first and second geomechanical calculations 421. That is, the third geomechanical calculations 422 can be unique to the Calculation Manager Extension object 415, whereas the first and second geomechanical calculations 421 can be unique to the Calculation Manager object 410. In some embodiments, the Calculation Manager Extension object 415 can also specify the priority of the geomechanical calculations 422 such that the calculations 422, in conjunction with the calculations 421, comprising the geomechanical workflow 500 can be executed by the processor 130 in the appropriate order.

The Calculation Manager object 410 can receive the above response from the Calculation Manager Extension object 415 and update reconstructed geomechanical workflow 500 so as to incorporate the new geomechanical calculations 422 from the add-in module. The Calculation Manager object 410 can use the priorities assigned by the Calculation Manager object 410 and the Calculation Manager Extension object 415 to generate a composite priority of each geomechanical calculation 421 and 422 comprising the geomechanical workflow 500 so that the calculations therein are appropriately ordered. This can enable the processor 130 to execute the geomechanical workflow 500 in the correct order.

Figure 4:
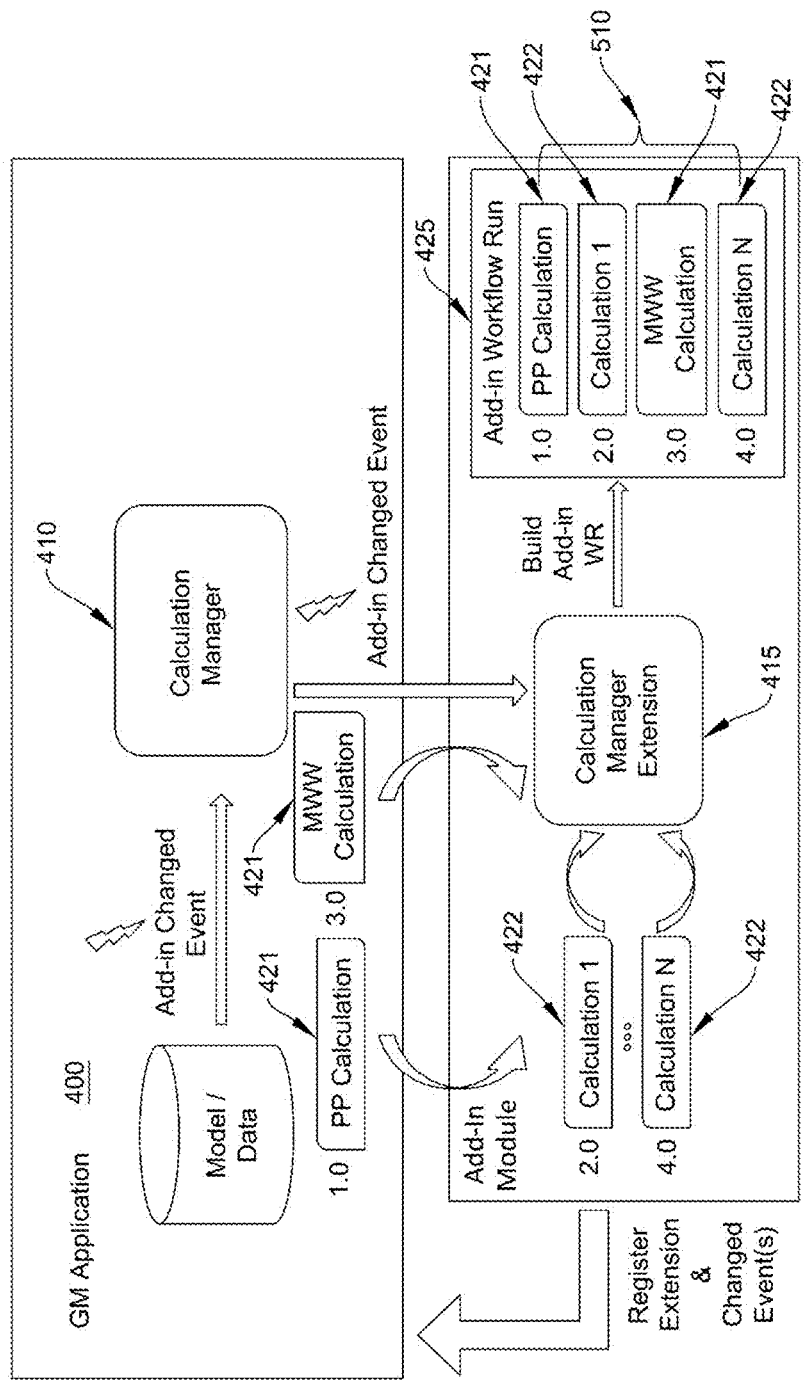
FIG. 4 is a diagram illustrating the construction of a geomechanical workflow in a geomechanics application incorporating a geomechanical workflow independently created in response to a newly specified changed event according to embodiments of the present disclosure.

Referring next to FIG. 4, which is a diagram illustrating the construction of the geomechanical workflow 500 in the geomechanics application 400 incorporating a geomechanical workflow independently created in response to a newly specified changed event according to embodiments of the present disclosure, the geomechanics application 400 can register an additional extension for the Calculation Manager object 410 in which an add-in module further enhances the geomechanics application 400 functionality by executing an independently constructed (or reconstructed) geomechanical workflow 510 in response to a newly specified changed event.

In detail, the add-in module of FIG. 4 can registers not only the Calculation Manager Extension object 415, but its own changed event(s) as well. Thus, the Calculation Manager object 410 can receive, or "listen" for, an indication of a changed event ("first changed event") from the geomechanical data 220, which is specified in the geomechanics application 400 core, in addition to an indication of a changed event ("second changed event") from the Calculation Manager Extension object 415 on the add-in module-side. The first changed event and the second changed event can differ from each other. In some embodiments, the second changed event can be detected only by the Calculation Manager Extension object 415, while undetected by the Calculation Manager object 410.

In some embodiments, the geomechanical workflow control module 140 can further comprise a fifth set of program codes for instantiating a Changed Event Extension object. The fifth set of program codes can be stored in the memory 120 of the client computer system 100. In some embodiments, the second changed event can be detected by the Changed Event Extension object which notifies the Calculation Manager Extension object 415 of the same.

Once the Calculation Manager Extension object 415 notifies the Calculation Manager object 410 of the newly registered changed event ("second changed event"), the Calculation Manager object 410 can be unable to construct a responsive geomechanical workflow 500 since it does not have access to dependency logic between that the second changed event and geomechanical calculations 421 existing in the main geomechanics application 400. Instead, the Calculation Manager object 410 can communicate with the Calculation Manager Extension object 415 to determine one or more geomechanical calculations 422 ("fourth geomechanical calculations") depending from the second changed event as identified by the Calculation Manager Extension object 415 according to its own geomechanical workflow dependency logic. In some embodiments, the one or more fourth geomechanical calculations can differ from each of the first, second, and third geomechanical calculations.

The Calculation Manager object 410 can then use each geomechanical calculation identified by the Calculation Manager Extension object 415 in conjunction with each geomechanical calculation identified by the Calculation Manager object 410 to reconstruct the geomechanical workflow 500. Alternatively, the Calculation Manager Extension object 415 can use the geomechanical calculations identified by the Calculation Manager Extension object 415 in conjunction with geomechanical calculations identified by the Calculation Manager object 410, if any, to reconstruct its own geomechanical workflow 510 adhering to the same process described above with respect to FIG. 3. As such, the geomechanics application 400 can execute its own core geomechanical workflow logic while permitting an add-in module to independently reconstruct its own geomechanical workflow 510 relying upon dependency logic between that the second changed event and geomechanical calculations unique to the Calculation Manager Extension object 415 that is inaccessible to the Calculation Manager object 410. The geomechanical workflow 510 can be executed by way of the Workflow Run Extension object 425 which causes the processor 130 to execute the reconstructed geomechanical workflow 510.

In some embodiments, the reconstructed geomechanical workflow 500 and the reconstructed geomechanical workflow 510 can be combined by the Calculation Manager object 410 into a single geomechanical workflow. The Workflow Run object 420 can cause the processor 130 to execute the combined geomechanical workflow.

It is to be understood that the embodiments of FIGS. 3 and 4, respectively, are not mutually exclusive of each other. Instead, aspects of the respective embodiments of FIGS. 3 and 4 can be combined in any manner so long as such combination is not inconsistent with the accompanying claims.

Accordingly, the systems for management of a geomechanical workflow of a geomechanics application in a computer system discussed herein can provide a mechanism by which a user may fully change the main geomechanics application logic. Such capability can enable the user to incorporate proprietary geomechanical workflow steps in conjunction with existing geomechanical workflow steps, resulting in a highly customizable and individualized geomechanical workflow solution.

It should be understood that terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "includes," or variations thereof, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Additionally, it is understood that one or more of the above methods, or aspects thereof, may be executed by a processor specifically programmed to execute the program code to perform one or more processes which are described in detail above. The processor may control operation of units, modules, parts, devices, or the like, as described herein. Moreover, it is understood that the above methods may be executed by an apparatus comprising the processor in conjunction with one or more other components, as would be appreciated by a person of ordinary skill in the art.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system for managing a geomechanical workflow of a geomechanics application in a computer system connected to a computer network, the geomechanical workflow comprising a series of calculations for performing an action with respect to a geomechanical feature, the system comprising:
   a geomechanical data source including one or more sensors configured to measure geomechanical data characterizing one or more aspects of the geomechanical feature; and
   a client computer system communicatively coupled to the geomechanical data source via the computer network, the client computer system including:
      a communication unit configured to receive the geomechanical data from the geomechanical data source via the computer network,
      a memory configured to store a plurality of program codes, and
      a hardware processor configured to execute one or more of the plurality of program codes, which when executed cause the hardware processor to implement a geomechanical workflow control module, the geomechanical workflow control module comprising:
         a first set of program codes for instantiating a Calculation Manager object configured to receive an indication of a first changed event in the geomechanical data triggering a reconstruction of the geomechanical workflow, to identify one or more first geomechanical calculations depending from the first changed event and one or more second geomechanical calculations depending from the one or more first geomechanical calculations, and to reconstruct the geomechanical workflow such that the geomechanical workflow includes each of the first and second geomechanical calculations,
         a second set of program codes for instantiating a Calculation Manager Extension object configured to identify one or more third geomechanical calculations depending from the first changed event, the one or more third geomechanical calculations different from each of the first and second geomechanical calculations, wherein the reconstructed geomechanical workflow further includes the one or more third geomechanical calculations, wherein each of the first and second geomechanical calculations represents a geomechanical calculation unique to the Calculation Manager object, and each of the third geomechanical calculations represents a geomechanical calculation unique to the Calculation Manager Extension object, and a third set of program codes for instantiating a Workflow Run object configured to cause the hardware processor to execute the reconstructed geomechanical workflow, wherein each of the first, second, and third sets of program codes is stored in the memory.

2. The system according to claim 1, wherein the Calculation Manager object is further configured to assign a priority to each of the first and second geomechanical calculations and to reconstruct the geomechanical workflow such that the geomechanical workflow includes each of the first and second geomechanical calculations in an order determined according to the assigned priority, such that the hardware processor executes each of the first and second geomechanical calculations in the determined order.

3. The system according to claim 2, wherein the Calculation Manager Extension object further configured to assign a priority to each of the third geomechanical calculations, and the Calculation Manager object is further configured to reconstruct the geomechanical workflow such that the geomechanical workflow includes each of the first, second, and third geomechanical calculations in an order determined according to the assigned priority, such that the hardware processor executes each of the first, second, and third geomechanical calculations in the determined order.

4. The system according to claim 3, wherein the Calculation Manager object is further configured to generate a composite priority of each of the first, second, and third geomechanical calculations based on the priority assigned to each of the third geomechanical calculations by the Calculation Manager Extension object.

5. The system according to claim 1, wherein the geomechanical workflow control module further comprises a fourth set of program codes for instantiating a Changed Event object configured to detect the first changed event in the geomechanical data and to provide the indication of the changed event to the Calculation Manager object, the fourth set of program codes stored in the memory.

6. The system according to claim 1, wherein the Calculation Manager Extension object is further configured to detect a second changed event in the geomechanical data triggering a reconstruction of the geomechanical workflow, the second changed event different from the first changed event, to identify one or more fourth geomechanical calculations depending from the second changed event, the one or more fourth geomechanical calculations different from each of the first, second, and third geomechanical calculations, and to notify the Calculation Manager object of the one or more fourth geomechanical calculations, the reconstructed geomechanical workflow further including the one or more fourth geomechanical calculations.

7. The system according to claim 6, wherein the second changed event is undetected by the Calculation Manager object.

8. The system according to claim 1, wherein operation of the Calculation Manager object implements core application logic of the geomechanics application, and operation of the Calculation Manager Extension object implements application logic of an add-in module inaccessible to the Calculation Manager object.

9. A system for managing a geomechanical workflow of a geomechanics application in a computer system connected to a computer network, the geomechanical workflow comprising a series of calculations for performing an action with respect to a geomechanical feature, the system comprising:

a geomechanical data source including one or more sensors configured to measure geomechanical data characterizing one or more aspects of the geomechanical feature; and a client computer system communicatively coupled to the geomechanical data source via the computer network, the client computer system including:

a communication unit configured to receive the geomechanical data from the geomechanical data source via the computer network, a memory configured to store a plurality of program codes, and a hardware processor configured to execute one or more of the plurality of program codes, which when executed cause the hardware processor to implement a geomechanical workflow control module, the geomechanical workflow control module comprising:

a first set of program codes for instantiating a Calculation Manager object configured to receive an indication of a first changed event in the geomechanical data triggering a reconstruction of the geomechanical workflow and to identify one or more first geomechanical calculations depending from the first changed event and one or more second geomechanical calculations depending from the one or more first geomechanical calculations, a second set of program codes for instantiating a Calculation Manager Extension object configured to receive an indication of a second changed event in the geomechanical data triggering a reconstruction of the geomechanical workflow, the second changed event different from the first changed event, to identify one or more third geomechanical calculations depending from the second changed event, and to reconstruct the geomechanical workflow such that the geomechanical workflow includes each of the first, second, and third geomechanical calculations, wherein each of the first and second geomechanical calculations represents a geomechanical calculation unique to the Calculation Manager object, and each of the third geomechanical calculations represents a geomechanical calculation unique to the Calculation Manager Extension object, and a third set of program codes for instantiating a Workflow Run object configured to cause the hardware processor to execute the reconstructed geomechanical workflow, wherein each of the first, second, and third sets of program codes is stored in the memory.

10. The system according to claim 9, wherein the Calculation Manager object is further configured to assign a priority to each of the first and second geomechanical calculations, and the Calculation Manager Extension object is further configured to assign a priority to each of the third geomechanical calculations and to reconstruct the geomechanical workflow such that the geomechanical workflow includes each of the first, second, and third geomechanical calculations in an order determined according to the assigned priority, such that the hardware processor executes each of the first, second, and third geomechanical calculations in the determined order.

11. The system according to claim 9, wherein the second changed event is undetected by the Calculation Manager object.

12. The system according to claim 9, wherein operation of the Calculation Manager object implements core application logic of the geomechanics application, and operation of the Calculation Manager Extension object implements application logic of an add-in module inaccessible to the Calculation Manager object.

* * * * *